United States Patent [19]

Dillon et al.

[11] 3,751,637

[45] Aug. 7, 1973

[54] DIGITAL COMPUTER AND FORM READER FOR INVENTORY CONTROL AND RECORDING CASH TRANSACTIONS

[75] Inventors: Neil J. Dillon, Los Angeles; Boris R. Sincich, Torrance, both of Calif.

[73] Assignee: TRW Data Systems, Inc., Torrance, Calif.

[22] Filed: May 25, 1972

[21] Appl. No.: 257,059

Related U.S. Application Data

[62] Division of Ser. No. 105,497, Jan. 17, 1971.

[52] U.S. Cl. .......................... 235/61.9 A, 340/172.5

[51] Int. Cl. .............................................. G06k 1/12

[58] Field of Search................. 340/172.5; 235/61.9, 235/61.9 A

[56] References Cited

UNITED STATES PATENTS 3,050,248 4/1962 Lindquist ..................... 340/172.5 X 3,406,387 10/1968 Werme ......................... 340/172.5 X 3,267,258 8/1966 Bene ............................ 340/172.5 X 3,665,407 5/1972 Negishi ........................... 340/172.5

*Primary Examiner*—Harvey E. Springborn

*Attorney*—Daniel T. Anderson et al.

[57] ABSTRACT

A digital computer employing hard wired control logic and a rotating memory drum system for inventory control, price changes and cash transactions. If desired, a novel form reader may be employed in conjunction with the computer to sense transactions and, in conjunction with the form itself, to actuate the computer at appropriate times. The computer and form reader are particularly suited for use in eating establishments where transaction speed is required.

2 Claims, 20 Drawing Figures

Patented Aug. 7, 1973 3,751,637

17 Sheets-Sheet 17

DIGITAL COMPUTER AND FORM READER FOR INVENTORY CONTROL AND RECORDING CASH TRANSACTIONS

This is a continuation, division, of application Ser. No. 105,497, filed Jan. 11, 1971.

BACKGROUND OF THE INVENTION

This invention relates to a digital computer employing a rotating drum memory and hard wired control logic and more specifically to the use of such a computer system in conjunction with a keyboard or a new and novel form reader, to provide an inventory count, tax and price change and a price readout for transactions. The invention is particularly applicable for use in fast food eating establishments and businesses having similar accounting and/or transaction modes.

The present invention also discloses programs or processes for operating the computer and the form reader in a simple and unique manner. Basically, the form reader and the process involving its use, is designed to sense data and transmit it to the computer, actuate the computer to perform specific operations at a given time, and to print out data from the computer using standardized forms. The computer program, on the other hand, is designed to operate the arithmetic portion of the computer itself, as well as manipulation and storage of data. While interrelated with the form reader operation, the computer program involves a separate and distinct function. The concept of interrupting the computer using a form itself not only facilitates a rapid input and output of data, but also permits a more simple construction and operation of the computer than would otherwise be possible.

BRIEF DESCRIPTION OF THE DRAWINGS

The invention will become more apparent from the description and the drawings to follow in which.

DESCRIPTION OF THE PREFERRED EMBODIMENT

Figure 1:
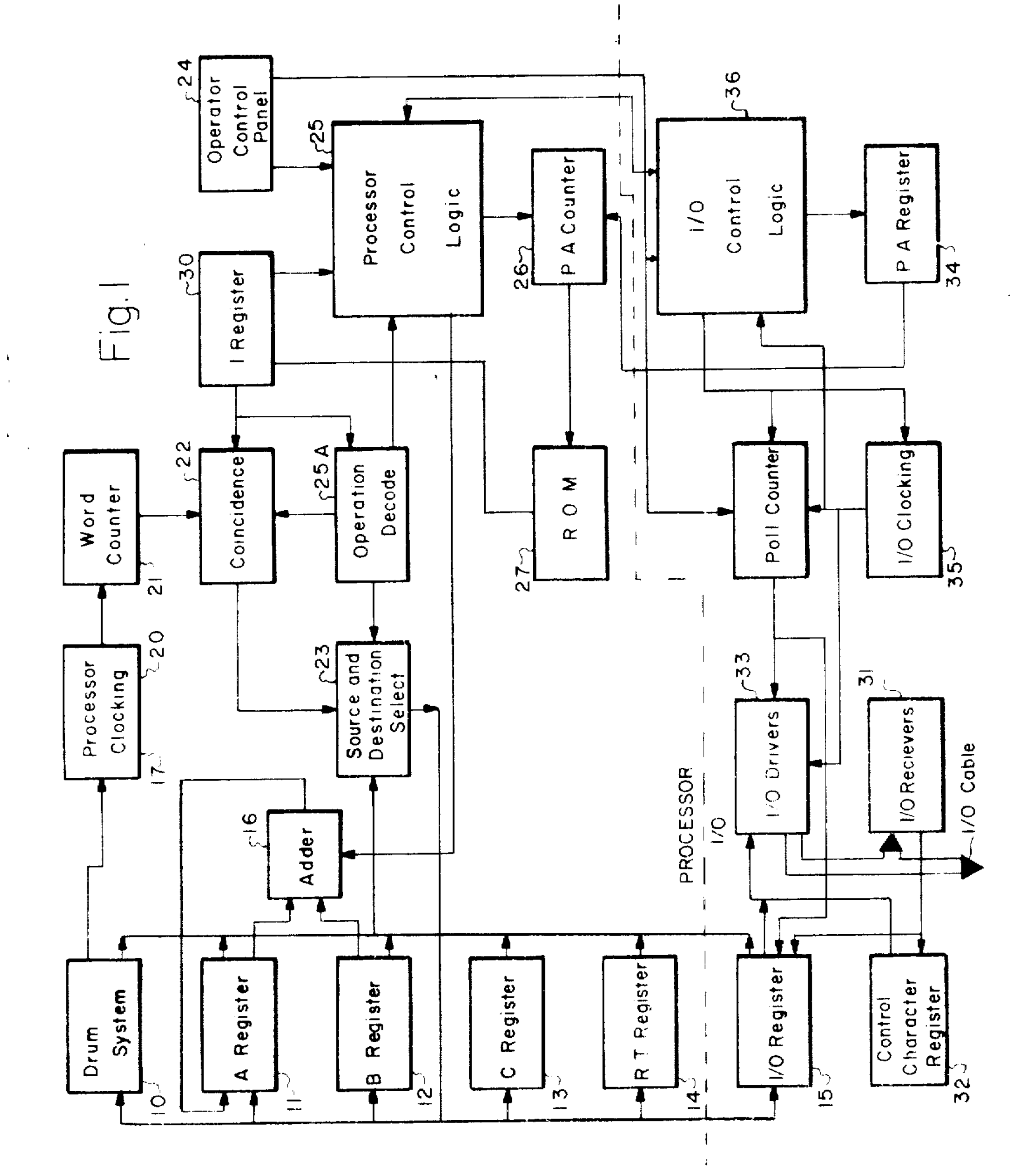
FIGS. 1 and 2 are block diagrams showing two aspects of the computer of the present invention.

The block diagram of the computer shown in FIG. 1 includes a rotating magnetic drum 10 having separate tracks for prices, quantities and a clock track. A and B accumulators 11,12 are registers which hold numbers to be added while a 2 digit C register and running total register 3,14 work together to maintain a constant count of accumulated dollar amounts. An input-output (I/O) 13,14 buffer 15 is serially loaded recirculating register employed as the primary data interface between and internal computer circuits and the form reader. An adder circuit 16 is provided to add (or subtract) the addend and augend in the A and B accumulators respectively, the result of the operation occurring in the adder being recycled back into the A accumulator; the B accumulator in an add operation remains unchanged. Clock pulses from the drum system clock track are forwarded to a clock distribution circuit in which emits these pulses for use in different parts in the computer. The arrangement compensates for variations in memory drum speed when reading data out of the drum. A shift register 20 (FIG. 2) functioning as a bit counter is employed to divide the digit flow from the drum into digit pulses. A word counter 21 receives digit pulses from the bit counter 20 and divides them into discrete word pulses, which are continually fed to a coincidence circuit 22. A source and destination select circuit 23 is provided to route signals into and out of the I/O buffer 15, accumulators, registers and the drum.

The logic and sequencing portion of the computer comprises an operator control panel 24 for selecting the particular mode in which the computer is to be operated; this will include a. item and quantity transactions, b. readout of data from the memory drum such as item quantity totals, total number of transactions etc., and c. updating of prices, taxes etc. A hard wired processor control logic circuig 25 generates a series of program step pulses or jump pulses depending on the current instruction and routes these program pulses to the appropriate location. A program address counter 26 is provided which functions as a register where the address of a current instruction word is recorded. Pulses from the processor control logic circuit 25 advace the program address counter by 1 step or cause the program address counter to jump in the program. A hard-wired, read-only-memory 27 converts an address output and breaks down an instruction from the program address counter 26 into an instruction word and forwards these words in sequence to an instruction register 30 where they are held temporarily pending their execution. If the command held in the instruction register is an addition command, it will be accepted by the process control logic, decoded and then forwarded to the adder. The remaining type of commands held in the instruction register will be decoded in an operation decode portion 25A of the processor control logic and be accepted in the coincidence circuit for transmission (along with its coincident pulse word from the data track) to the source and destination select 23 and thence to the registers or the drum system.

The input/output (I/O) section of the computer includes an input-output receiver 31 which transmits pulses from a suitable input such as from a photosense circuit or keyboard to the input-output (I/O) register 15 and control character register 32. The latter stores data pulses from the I/O receiver for transmission to an I/O driver 33. The pulses from the I/O register are sent to the source and destination select circuit 23. Driver 33 operates a printer (not shown) and a form reader in input-output receiver 31. A poll counter is provided to determine if the computer is operating a given keyboard. When the computer time is free, the poll counter will activate the input-output driver to commence oeprations on a specific keyboard. A program address register 34 is provided to hold address words and transmit them to the program address counter 26 during an interrupt by an I/O control logic. An input-output clocking circuit 35 synchronizes scanning cycles of the form reader, movement of the form through the reader, and printer actuation. The clocking circuit also sequences the transfer of program addresses to the program address counter 26 from the program address register 34, and synchronizes this transfer with the input pulses from the photosense circuit. An input-output (I/O) control logic circuit 36 emits sequenced pulses to produce a program address in register 34; this address is determined by the respective setting in the operator control panel 24 for transaction, readout and update modes and by the control character register 32. The processor control logic circuit 25 and the I/O control logic circuit 36 interchange data and interrupt addresses from the program address register 34. Thus, program addresses from the program address register 34 and data from the photosense circuits or keyboard in the I/O receivers are timed by clocking circuit 35 to coincide in the source and destination select circuit 23.

Figure 2:
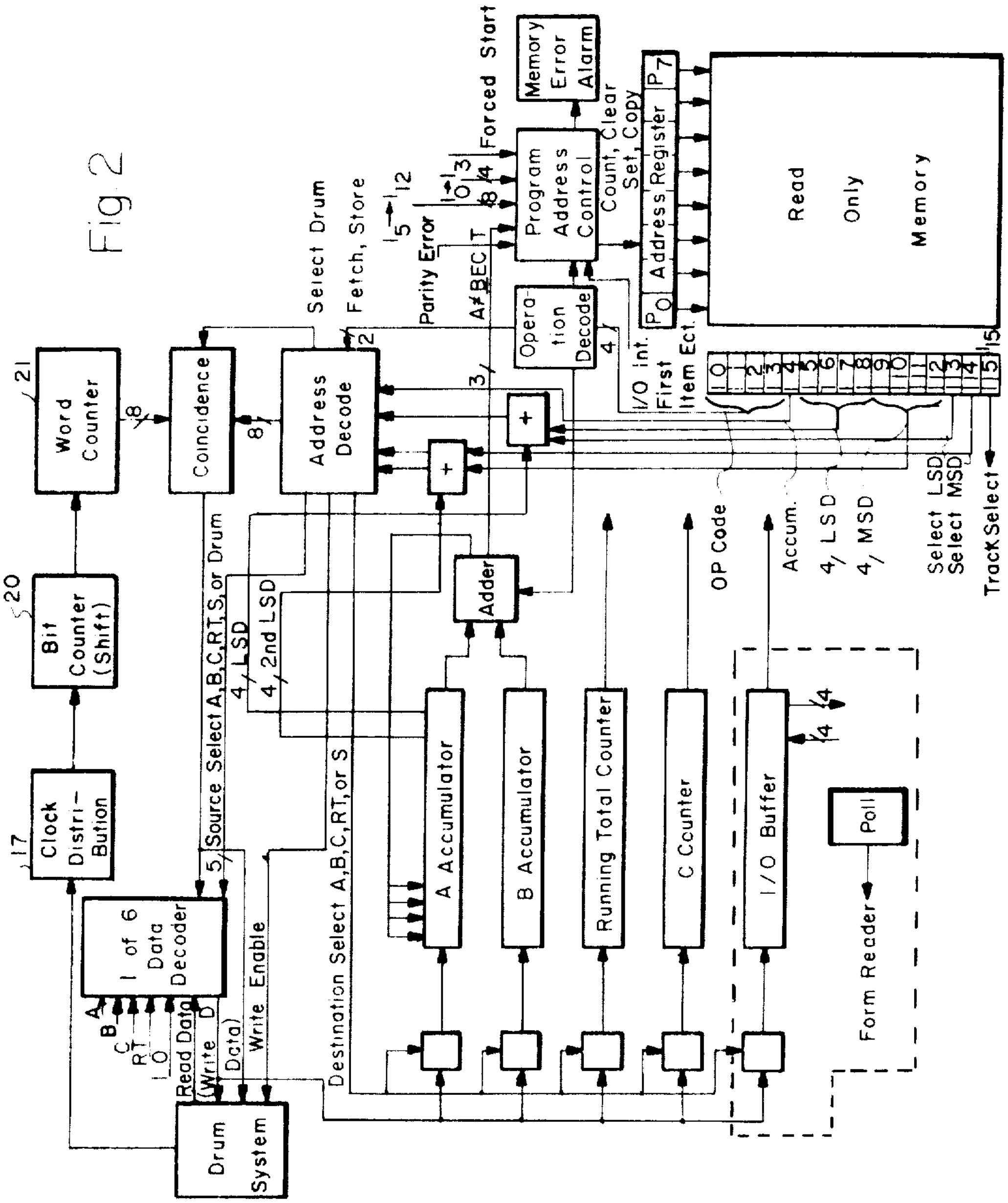

The routing of instruction words is shown in FIG. 2. Typical drum track locations, computer register addresses and command codes are shown in the following table.

TABLE 1

| Drum track | | | | | |
|---|---|---|---|---|---|
| P track address | | | 5% tax constants | Q track address | |
| 00 | | | | 00 | |
| 01 – 35 | 35 item prices | | | 01 – 35 | 35 item quantity totals. |
| 36 | | | | 36 | |
| 37 | | | | 37 | |
| 38 | | | | 38 | |
| 39 | | | | 39 | |
| 40 | Tax breakpoint $K_b$ | | 000089 | 40 | |
| 41 | $K_0$ | 0¢ tax | 000010 | 41 | 1 thru 9 drawer totals (41–49). |
| 42 | $K_3$ | 3¢ tax | 000068 | 42 | |
| 43 | $K_5$ | 5¢ tax | 000000 | 43 | |
| 44 | $K_7$ | 7¢ tax | 000000 | 44 | |
| 45 | $K_1$ | 1¢ tax | 000027 | 45 | |
| 46 | $K_4$ | 4¢ tax | 000089 | 46 | |
| 47 | $K_6$ | 6¢ tax | 000000 | 47 | |
| 48 | $K_8$ | 8¢ tax | 000000 | 48 | |
| 49 | $K_2$ | 2¢ tax | 000047 | 49 | |
| 50 | $PP_0$ | X0 tax rate | 000000 | 50 | |
| 51 | $PP_1$ | X1 tax rate | 005000 | 51 | Grand total. |
| 52 | $PP_2$ | X2 tax rate | 010000 | 52 | Taxable total. |
| 53 | $PP_3$ | X3 tax rate | 015000 | 53 | Nontaxable total. |
| 54 | $PP_4$ | X4 tax rate | 020000 | 54 | Total tax. |
| 55 | $PP_5$ | X5 tax rate | 025000 | 55 | Transaction count. |
| 56 | $PP_6$ | X6 tax rate | 030000 | 56 | |
| 57 | $PP_7$ | X7 tax rate | 035000 | 57 | |
| 58 | $PP_8$ | X8 tax rate | 040000 | 58 | Partial tax total. |
| 59 | $PP_9$ | X9 tax rate | 045000 | 59 | Active drawer. |
| 60 | 000050 | | 000050 | 60 | |
| 61 | 000001 | | 000001 | 61 | |
| 62 | | | 800000 | 62 | |
| 63 | $K2_0$ | 0¢ tax | 000009 | 63 | |
| 64 | $K2_3$ | 3¢ tax | 000069 | 64 | |
| 65 | $K2_5$ | 5¢ tax | 000100 | 65 | |
| 66 | $K2_7$ | 7¢ tax | 000000 | 66 | |
| 67 | $K2_1$ | 1¢ tax | 000029 | 67 | |
| 68 | $K2_4$ | 4¢ tax | 000089 | 68 | |
| 69 | $K2_6$ | 6¢ tax | 000000 | 69 | |
| 70 | $K2_8$ | 8¢ tax | 000000 | 70 | Forever total. |
| 71 | $K2_2$ | 2¢ tax | 000049 | | |

| Computer registers | | Command codes (op. code) | | |
|---|---|---|---|---|
| S1 | A ACCUMULATOR | 0001 | FETCH | TO A OR B ACCUM. |
| S2 | B ACCUMULATOR | 0010 | STORE | FROM A OR B ACCUM. |
| S3 | C REGISTER | 0011 | ADD* | A+B |
| S4 | RT REGISTER | 0100 | SHIFT* | A ACCUM. |
| S8 | I O BUFFER | 0101 | INCC* | INCREMENT C+1 |
| | | 0110 | DECC* | DECREMENT C−1 |
| S0 | FORCED ADDRESS* | 0111 | EIO* | ENABLE I/O |
| | | 1000 | IIO | INTERROGATE I/O |
| | | 1001 | JUNC | JUMP UNCONDITIONAL |
| | | 1010 | JEQ | JUMP A=B |
| | | 1011 | JNEQ | JUMP A≠B |
| | | 1100 | JLEQ | JUMP A−B |
| | | 1101 | JCNEO | JUMP C NOT=ZERO |
| | | 1110 | SUB* | A−B |
| | | 1111 | CAL | A±B (KEYSWITCH) |

Figure 3:
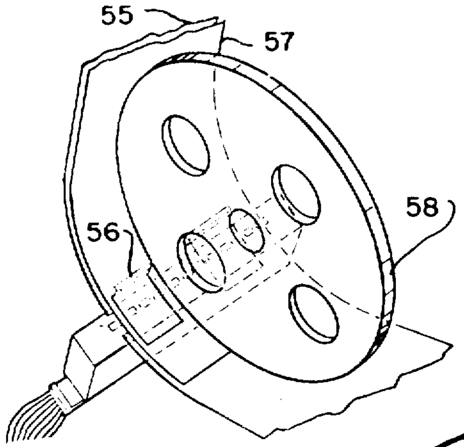
FIGS. 3, 4 and 5 are schematic perspective views of the form reader unit of this invention.
Figure 4:
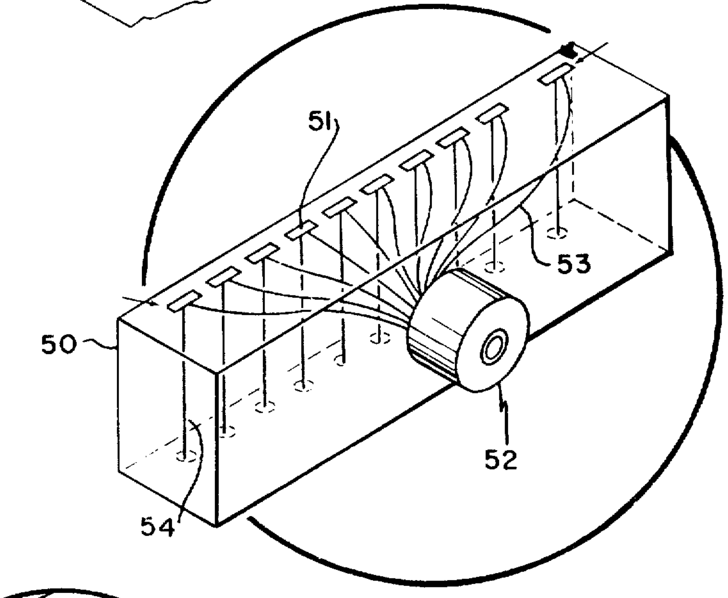
Figure 5:
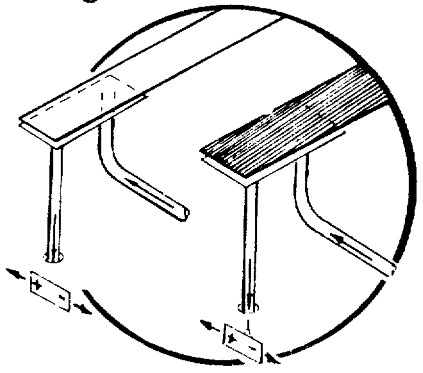

The form reader unit of this invention is shown schematically in FIGS. 3, 4 and 5 and comprises a photo light block 50 having a plurality of light windows 51, a light source (not shown) and a housing 52. Each light window is fed by an inlet optic fiber bundle 53 from the housing. Light emitted by an individual window is passed along an outlet fiber bundle 54 from each window to a photo sensor device. A scanning circuit, in the photosensor, senses light (or no light) pulses from each window in sequence. A slotted form guide 55 is provided immediately adjacent the light block and the individual array of light windows are exposed along the slotted portion of the guide. A spring 56 is provided along the form guide 55. A form 57, which will be described in more detail subsequently, is passed under the spring 56 and in immediate proximity to the light windows 51. The spring insures the form 57 is as close as possible to the array of light windows. A drive wheel 58 is employed to move the form along the form guide and past the light window array. When light is passed along an inlet fiber bundle 53, it will impinge on the white surface of the form and be diffused along the form for a short interval; it will then reflect onto an outlet fiber bundle 54 and finally be transmitted to the photo sensor which will convert the light to a zero signal. However, if the portion of the form adjacent the light window has been marked with a black or dark pencil, light will not be diffused along the form immediately adjacent the window; hence, no light will be transmitted along the output glass tube. This will cause a positive signal to be recorded in the photo sensor. Thus, the presence or absence of a black pencil mark will produce either a signal or no signal from the photo sensor and this can be translated into a pulse which is either 1 or 0. It will be appreciated that the present concept of diffuse light detection is significantly different from the usual concept of light sensing by direct transmission. Normally, direct transmission requires a precise mechanical alignment between the source and the photo sensor unit, which is not the case in the present invention.

Figures 6, 7:
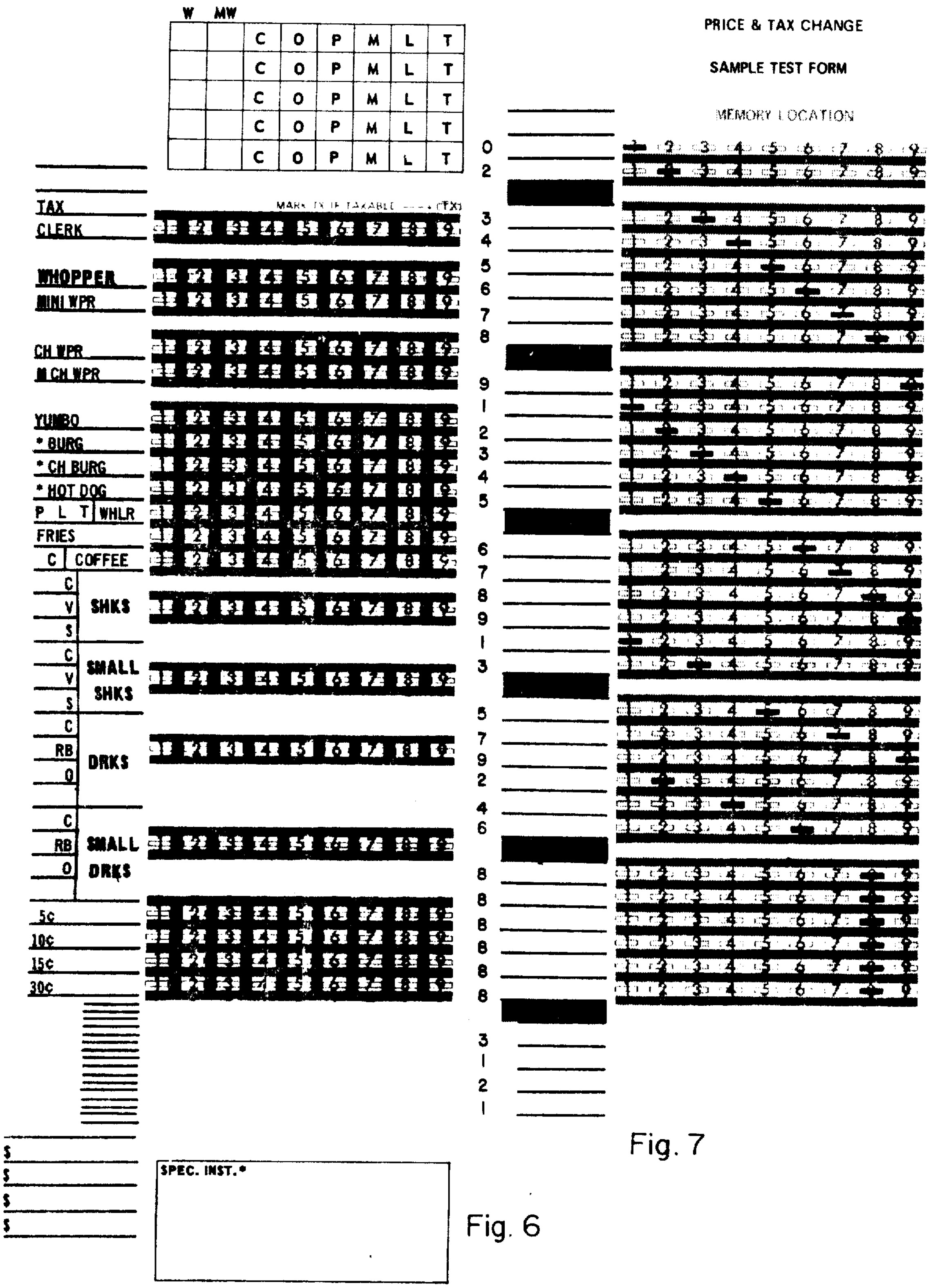
FIGS. 6 7 and 8 show forms employed to read data into and out of the computer.
Figure 8:
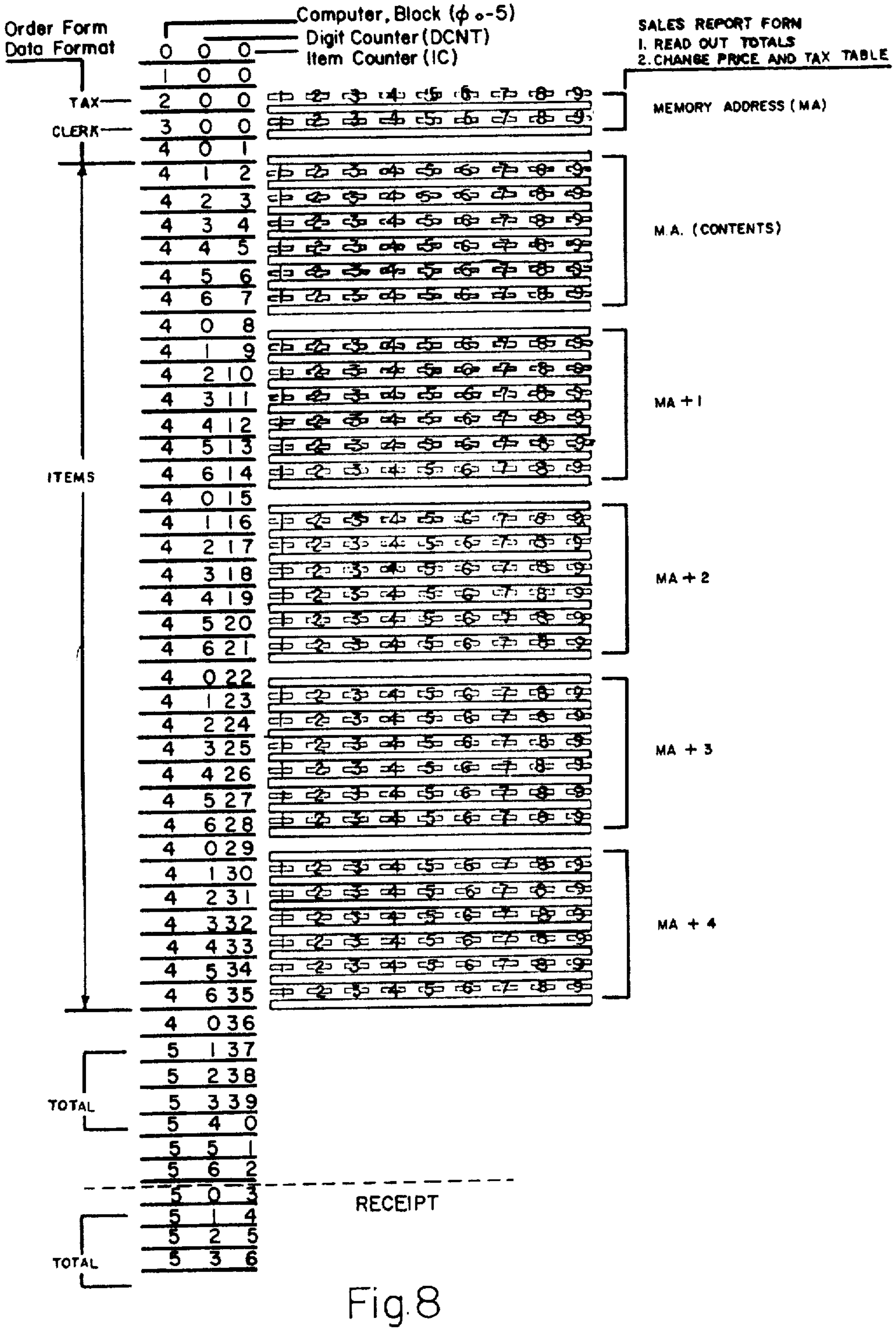
Figure 9A:
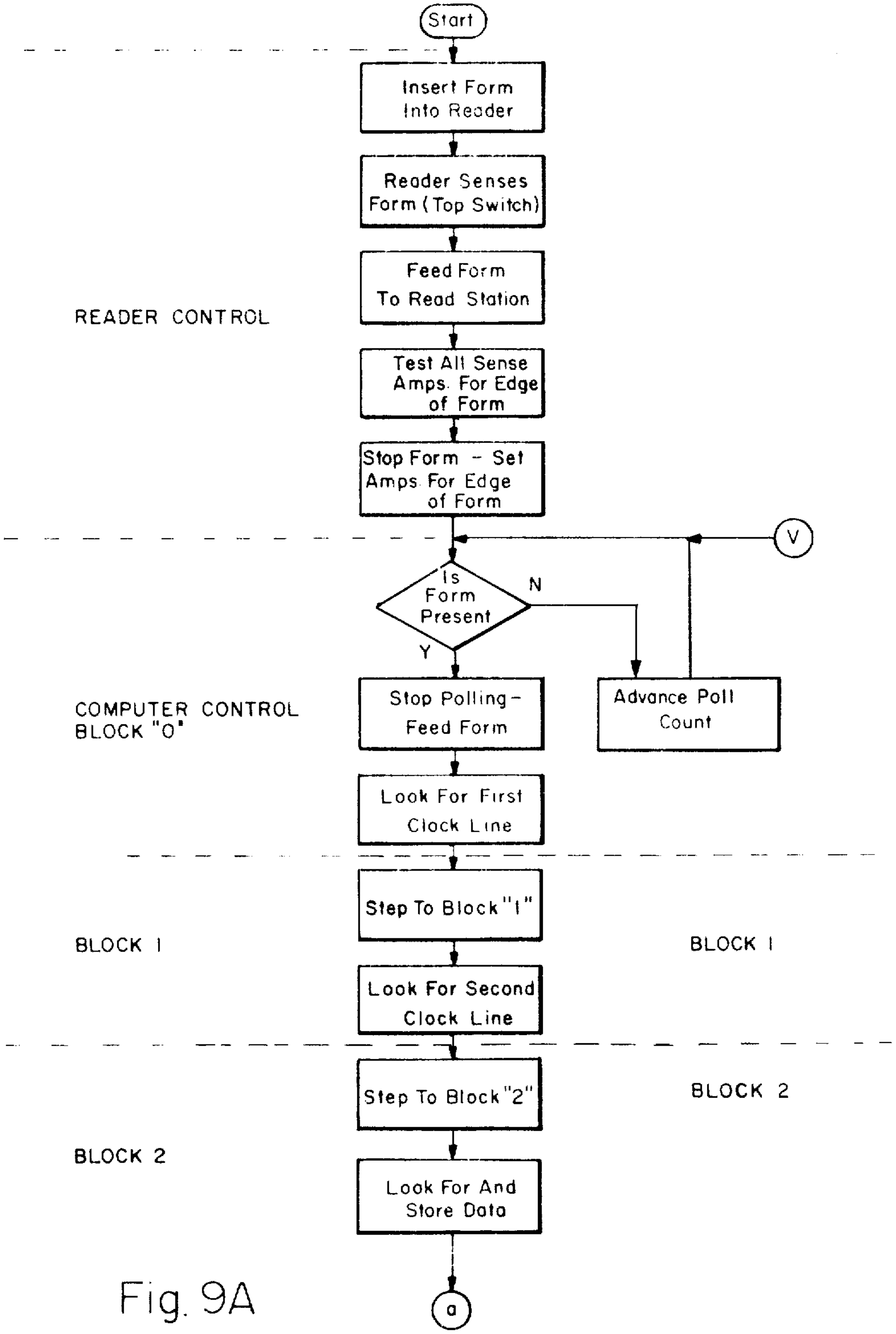
FIGS. 9 (A–F) shows the program flow command.
Figure 9B:
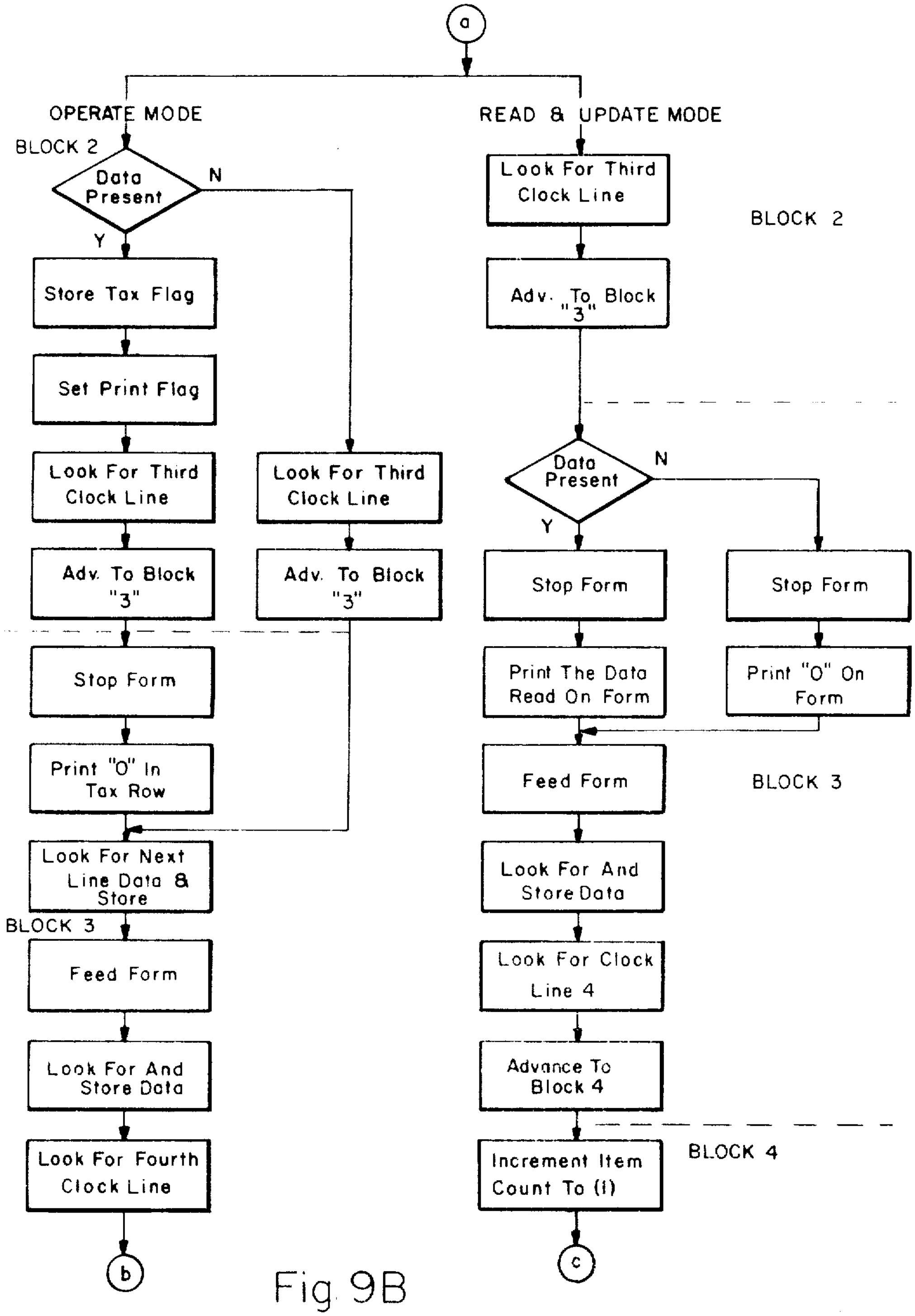
Figure 9C:
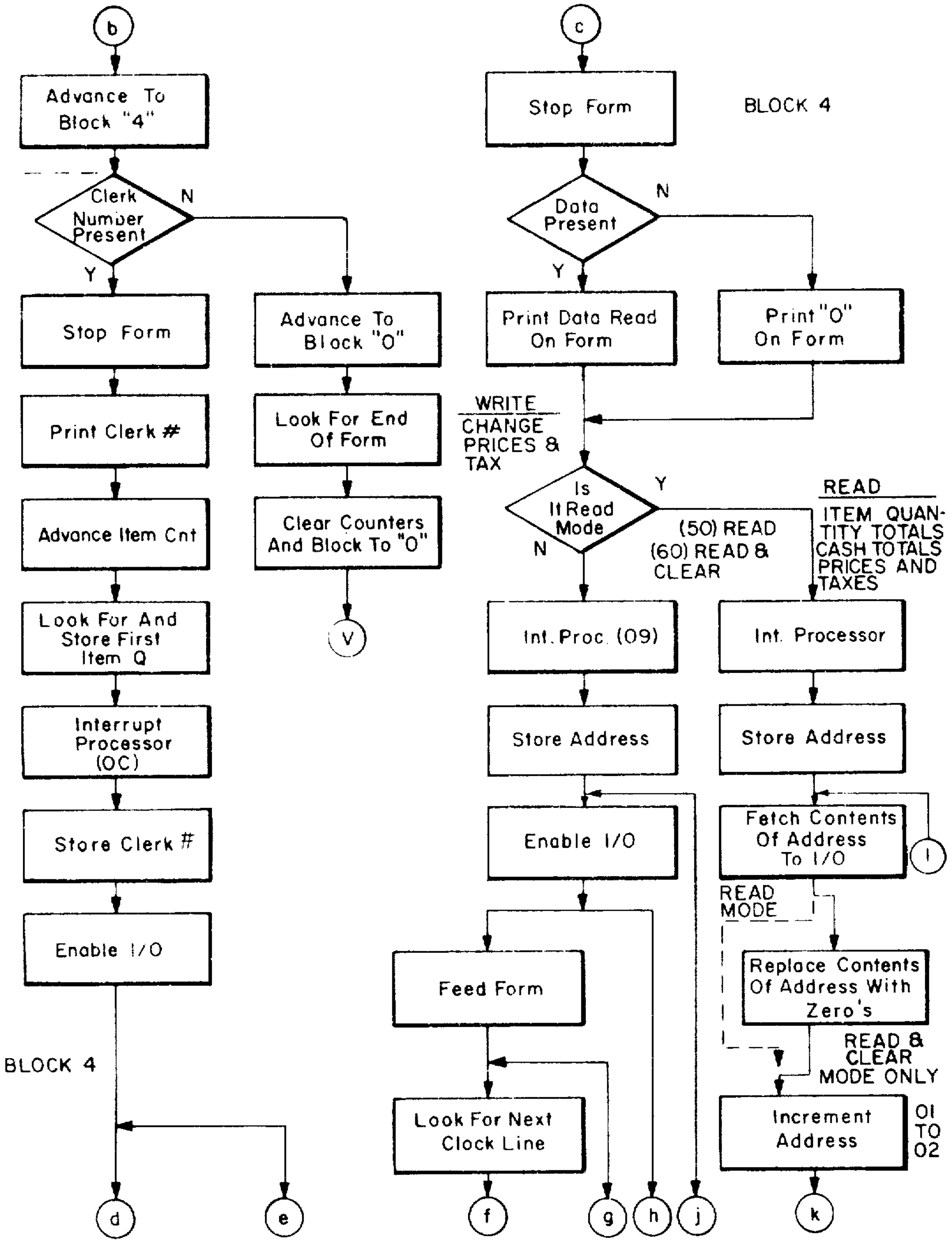
Figure 9D:
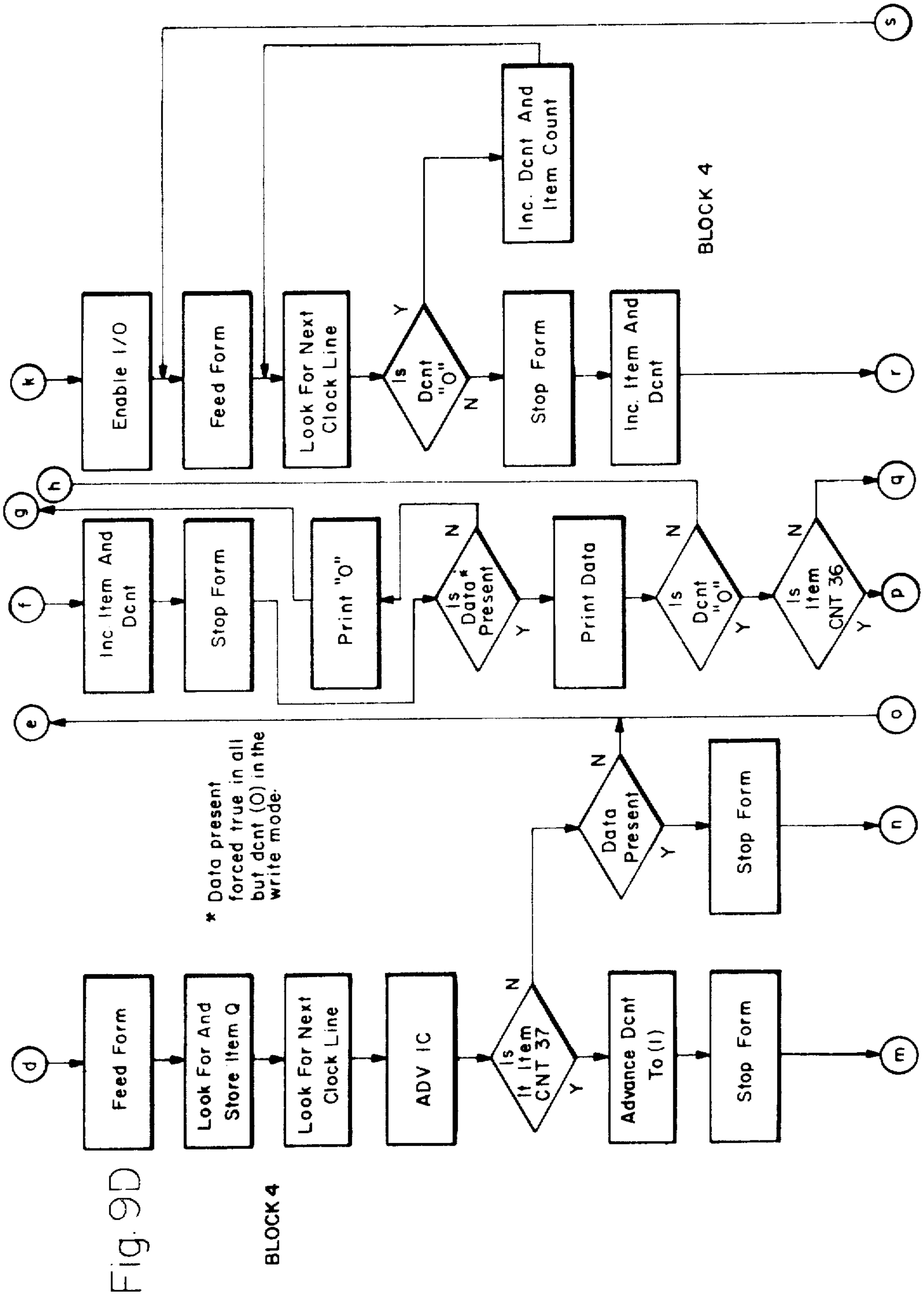
Figure 9E:
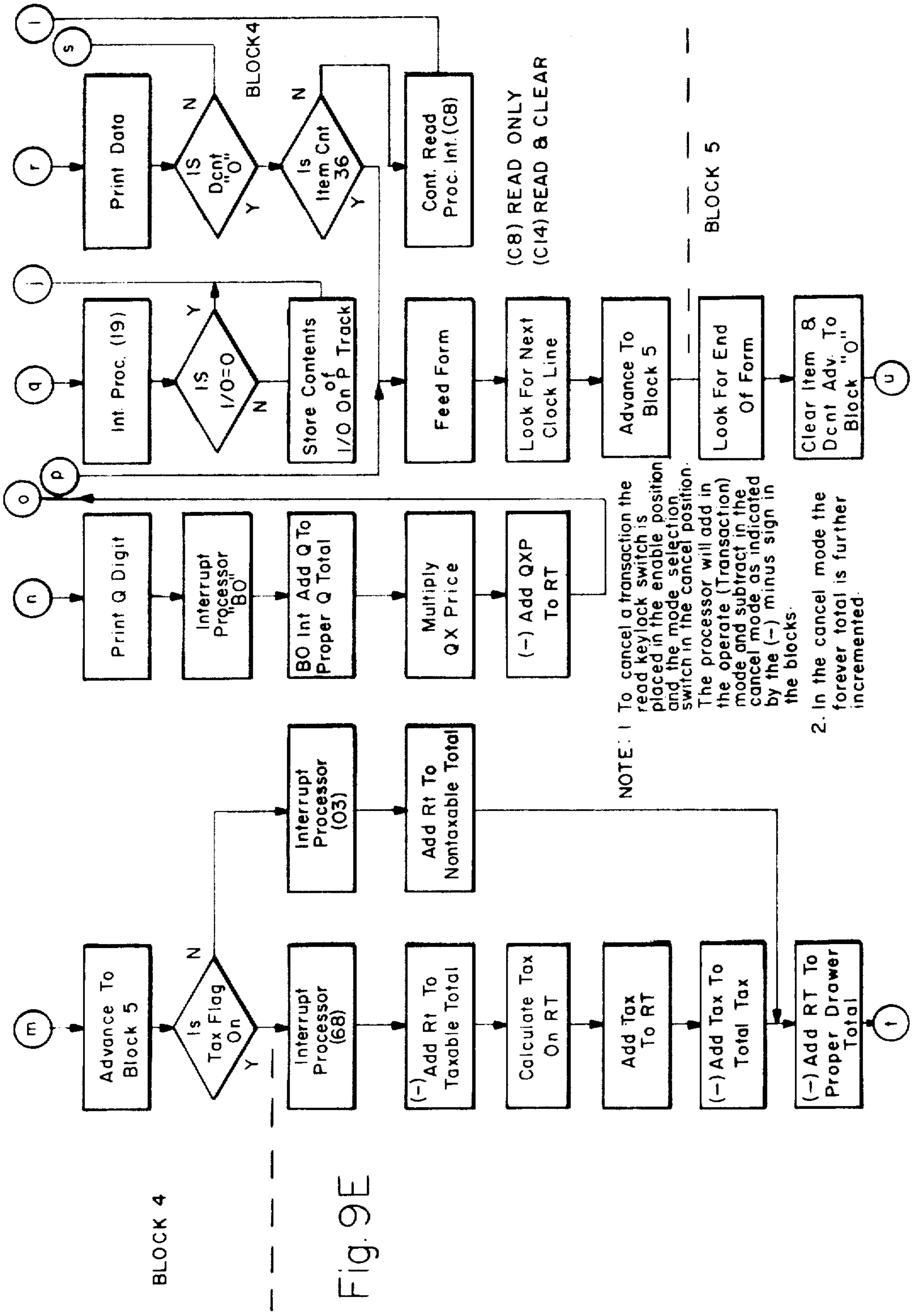
Figure 9F:
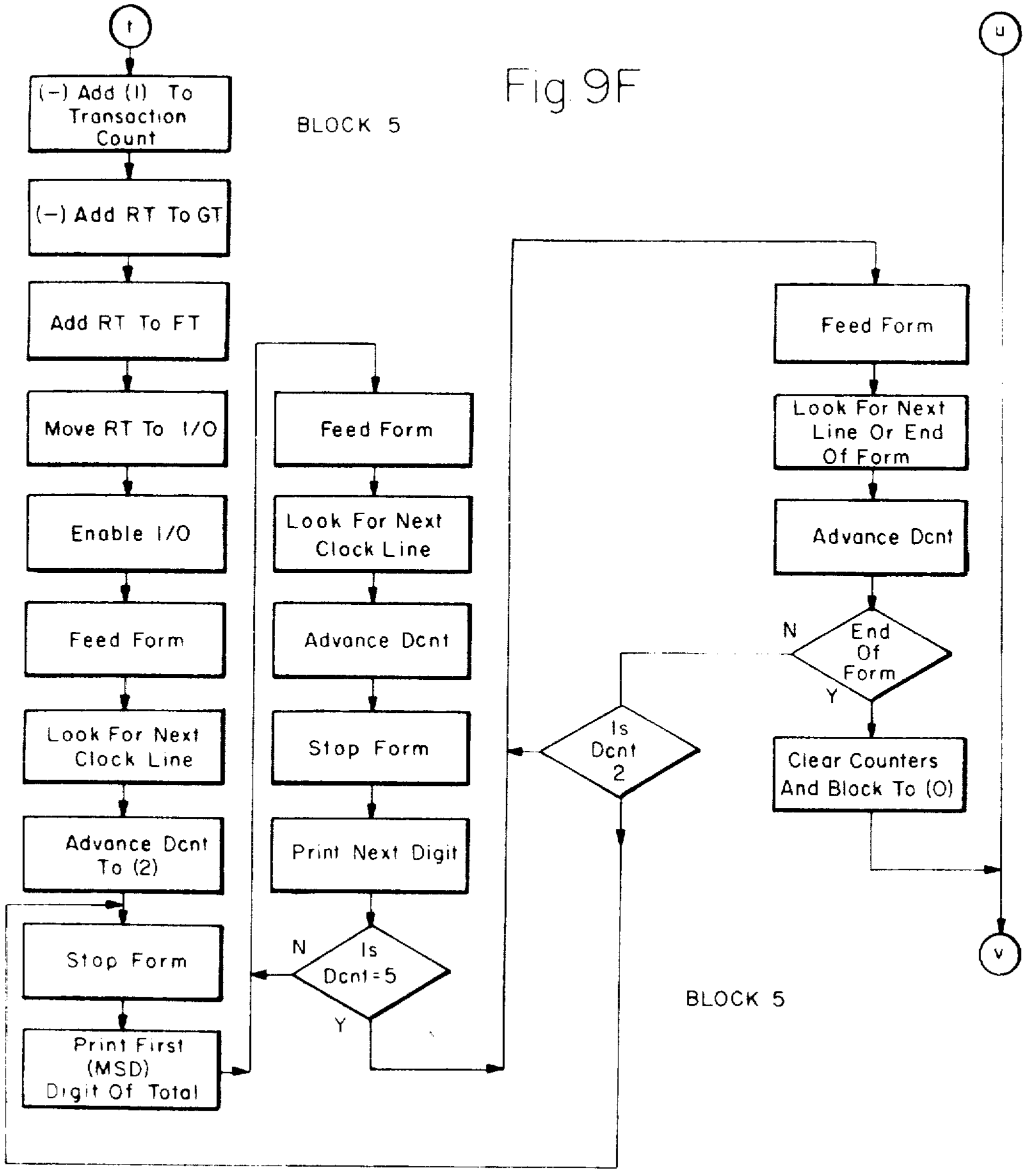

FIGS. 6, 7 and 8 illustrate the various forms employed for reading information into and obtaining information from the computer.

FIGS. 6 and 7 show forms employed for transaction purposes to indicate the nature of each item sold, the number of items, the cash value, the tax, and the final total. A number of selection is also provided to identify a particular clerk making a sale. In FIGS. 6 and 7 the first column comprises a list of food items and a series of black horizontal clock lines. The black horizontal clock lines in the first column activate or enable the computer at different intervals. The starting and stopping of the form drive wheel is also initiated by the clock lines as well as the initiation of various program functions in the computer. The second column shown as 1 to 9 ar numbered data block windows employed to indicate the quantity of a particular purchase. A square is provided and designated "TX" to indicate whether the transaction is taxable. The box marked "SPEC INST" is provided for the clerk to indicate if special instructions for a particular order are required; these special instructions are not recorded in the computer.

An individual window, when marked, indicates the quantity of an item purchased. The computer I/O detects this quantity by counting the clock lines and sensing the marked data block corresponding to a particular line. It will be observed that each clock line is ahead of its corresponding data block. This arrangement permits a clock line to enable or activate a digit counter (not shown) in advance of the scanning cycle. Thus, the photo sensor will be activated in sufficient time for effective scanning of a data block during a scan cycle.

In operation and referring to the program flow, in FIGS. 9A to 9F, a form is first marked by the clerk and then fed into the form reader. At this point in the program the form reader controls the operation of the program. A switch [not shown] in the form reader senses the top of the form causing the form reader to drive to feed the form to the read station. When the top of the form arrives at the light window 51 it is sensed by the photo sense unit which then stops the form and sets a form present flag (indicator). At this point in the program the control of the form then passes from the reader to the computer; the program flow then enters the computer control block "O" section. When no form is present in any reader station the computer will merely idle in the advance poll count loop. However, when a form is in the reader and available for sensing, the program enters the main path from the advance poll count, the polling unit ceases to poll and the form is fed until the first clock line is sensed in the clock line window.

The program flow then enters Block 1 in the program and the second clock line is sensed. No data sensing is provided for Block 1 in this particular program, and its use is hence optional.

The program then advances to Block 2 (which programs the tax calculation) and the first clock line is read and sensed.

In the transaction mode the transaction form shown in FIG. 6 is employed. If the transaction is taxable the tax block in the form will be marked; this mark will be sensed and cause a tax flag to be stored in the read-only-memory for use later in the program. A print instruction is set, a third clock line is sensed and the program advances to Block 3.

In Block 3 the form is stopped and the number zero is printed on the form in the tax row; this indicates the transaction is taxable. Referring to Block 2 if no taxable item is present in the transaction the tax block will not be marked and th program will jump from Block 2 and rejoin the main program as indicated. The next data line (i.e., the clerk number line) is then scanned and the data is stored; the clerk number is then printed and the form feed continued. The clerk data is then stored on the drum, the fourth clock line is sensed and the program advances to Block 4.

In Block 4 if the clerk has not marked a number in the clerk data block, the program will abort; this causes the form to be rejected completely through the form reader and all counters and registers in the computer to be reset to zero. Assuming a clerk number has been marked in the data block, the program will continue along the main path; the form is stopped and the clerk number is printed. The item counter is then incremented until a data block is found which has been marked by the clerk. The first item quantity is then detected, read and stored, and at this point an interrupt procedure is then initiated in the computer to indicate the quantity and amount of items which have been purchased. This is shown in more detail in the program flow chart in FIG. 11. The input-output is enabled, the form is fed further, a succeeding data block is searched and the next clock line sensed. If no data is present in a particular data block, the program reiterates; this causes the feeding and searching process to continue until all data blocks have been searched. When data is present, the form is stopped, a quantity digit corresponding to the amount purchased is printed onto the form and a second [BO] interrupt routine (quantity transaction) is entered into. Next, the quantity of purchase is added to the total number of specific items previously sold, the quantity $x$ price is computed, and this amount is placed into the running total. Continuing with the main program in Block 4, after all items (here 37 in all) have been calculated, the digit count is advanced, the form stopped and the program advances to Block 5.

Referring back to Block 4, if the transaction was not marked taxable, the processor will enter the end-transaction routine at hexadecimal address 03. The running total will be added to the nontaxable total and the branch will join the main program as indicated. If the transaction was taxable an interrupt [location 68] routine (an end transaction taxable) is entered into, the running total is added to the taxable total, the tax on the running total is calculated and this tax is added to the running total. The tax is also then added to the tax total already in the drum. The running total amount will then be added to the appropriate clerk total in the drum, the transaction count will be incremented, and the running total will be added to the grand total and also to the forever (non-alterable) total. The running total is then transferred to the input-output which is then activated. The form is fed, the next clock line is sensed, the digit counter is advanced to 2; this determines the location for printing the M.S.D. of the total. The form is then stopped. The remaining portion of the program then simply involves a print out in dollars and cents until the end of the form has been reached, after which the form exits from the form reader with the completed quantities of items ordered and their total value in dollars and cents. The counters are cleared and the computer and form reader are then ready to accept a new transaction slip.

In the read or update mode a readout or update form shown in FIGS. 7 or 8 is employed. Each form contains a group of five consecutive addresses prefaced by a starting address. The read and update forms differ from the transaction form in that datum between clock lines 2 and 3 is not tax information. Instead, this datum is the most significant digit of the first address in a consecutive group of five addresses; the datum between clock lines 3 and 4 is the least significant digit of the first address. Thus a "12" address in the starting address or memory address will be followed by the contents of addresses 12, 13, 14, 15 and 16 in the drum.

At the read and update point in the program, the third clock line is sensed and the program advances to Block 3. Here, if data to be recorded for update are present in a particular data block, the form is stopped and the M.S.D. address number for a particular item is sensed and printed on the form; if no M.S.D. is present the program branches, the form is stopped, a zero is printed on the form and the branch then rejoins the program as indicated If M.S.D. data are present, the form is stopped and these data are printed. The next data block is searched and stored, the clock line is sensed and the program advances to the fourth block.

The item counter is incremented, the form is stopped and the L.S.D. printed if present. This will produce an appropriate 2 digit address from which information will either be read into or out of the memory drum.

If a write mode is involved an [09] interrupt (i.e., start up date) is entered into, the address is stored in the register and the I/O is then enabled. The form is fed, the next clock line sensed and the item and digit counters are incremented. The form is then stopped so no data are present, a zero is interpreted. The program reiterates until data are sensed; when data are present, it is printed and the process repeated until the digit count is zero. This indicates the last digit of a six digit word has been printed. When the item count has reached 36 (i.e., completed), the form is fed out of the machine as shown in Block 5, the counters are cleared and the digit counter is advanced to zero as the form is ejected from the machine. If the item count has not been completed the program iterates and continues to update (process interrupt [19] the contents of the input-output register (if not equal to zero) which are stored on the P track. This routine is continued until all prices have been stored.

In the read mode, as shown in FIGS. 6, 7 and 8, the starting address in a group of five addresses is stored and the contents of the memory drum for the particular address are fetched from the drum to the input-output register. In the read and clear sub-routine, the contents of a particular address in the memory drum are replaced with zeros and the program continues along the main course. The address is then incremented to the second address in the group of five, the input-output is enabled, the form is fed and the next clock line is sensed. If the clock line advances the digit count to zero, the clock line search continues and no print-out occurs. Otherwise, the form is stopped. The digit counter is incremented and the next digit in the 6 digit word is printed out. The process is repeated until all 6 digits have been read out and the form is then fed out of the form reader. The program will continue looping until all five words (36 clock lines) have been read out of the memory and printed onto the form.

Figure 10:
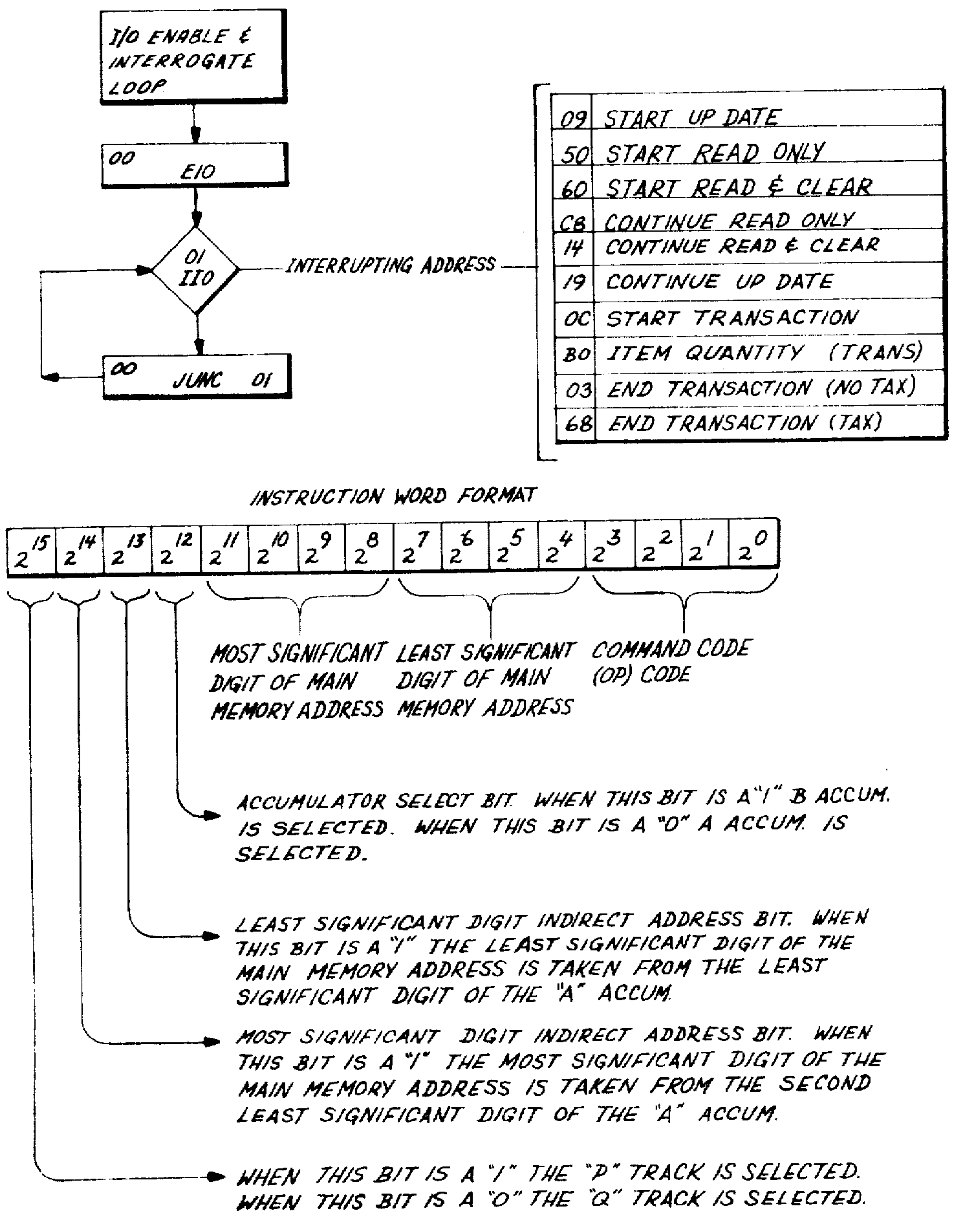
FIG. 10 shows the operating codes interrupting address and instruction word format.
Figure 11A:
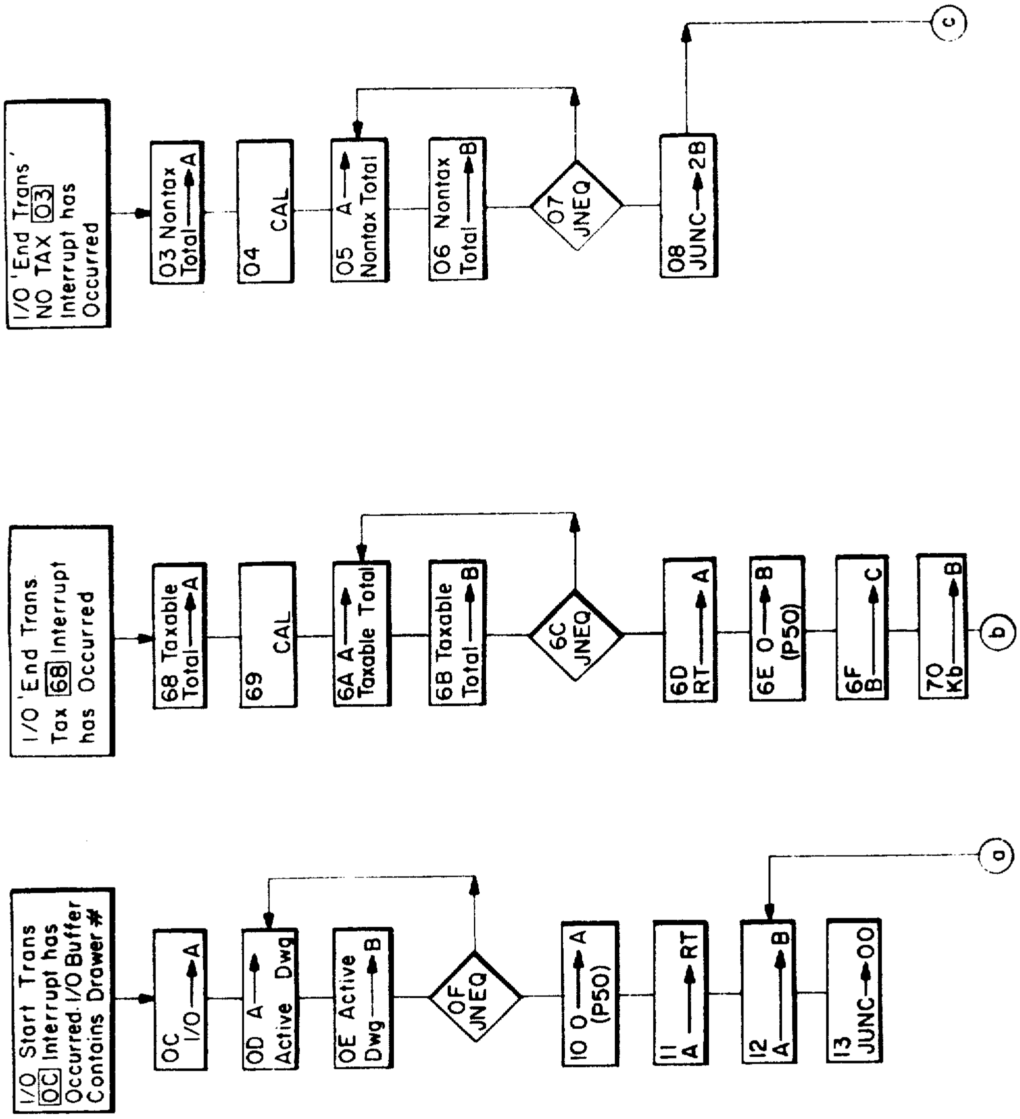
FIGS. 11 (A–D) and 12 show the detailed program flow for the computer.
Figure 11B:
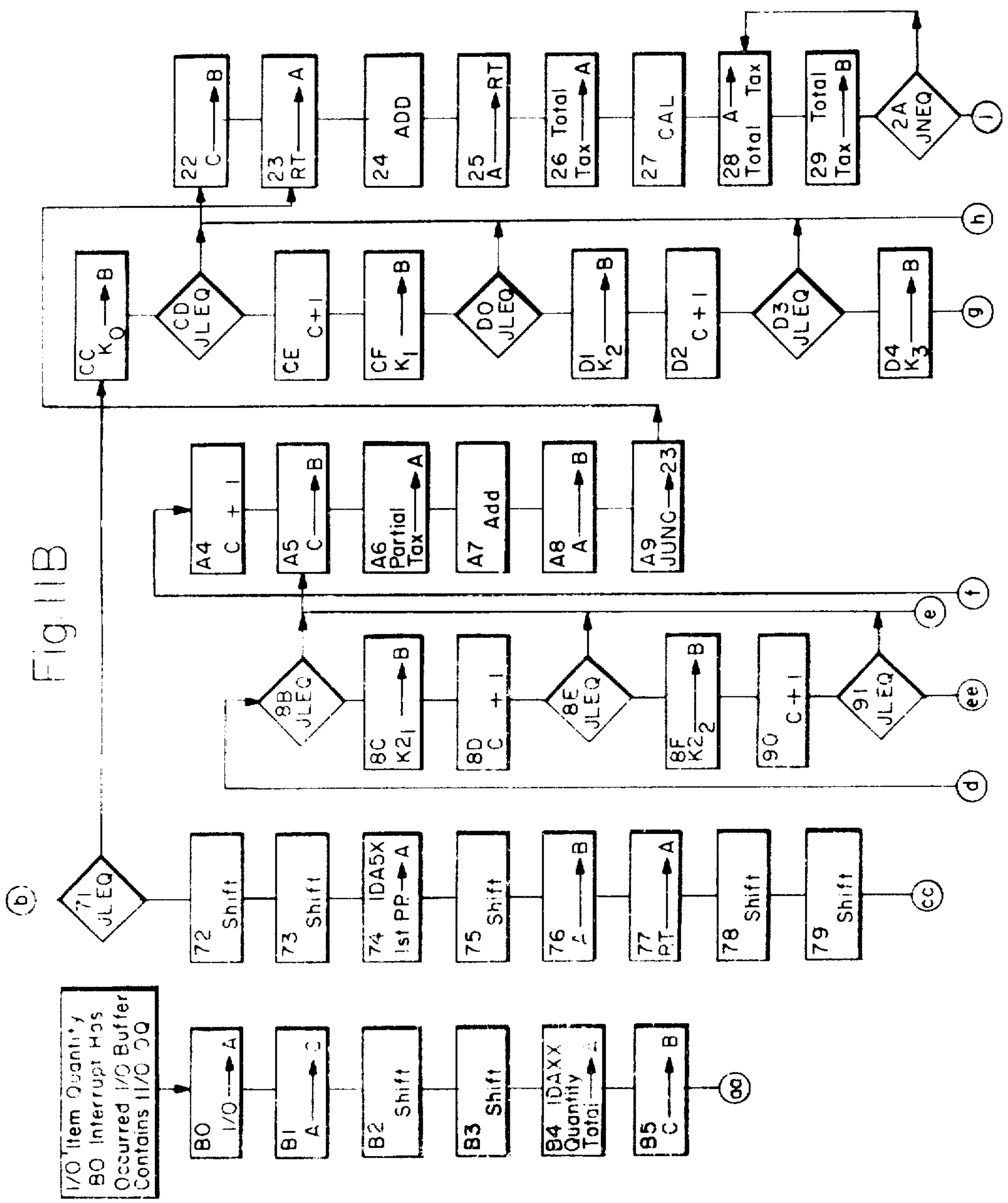
Figure 11C:
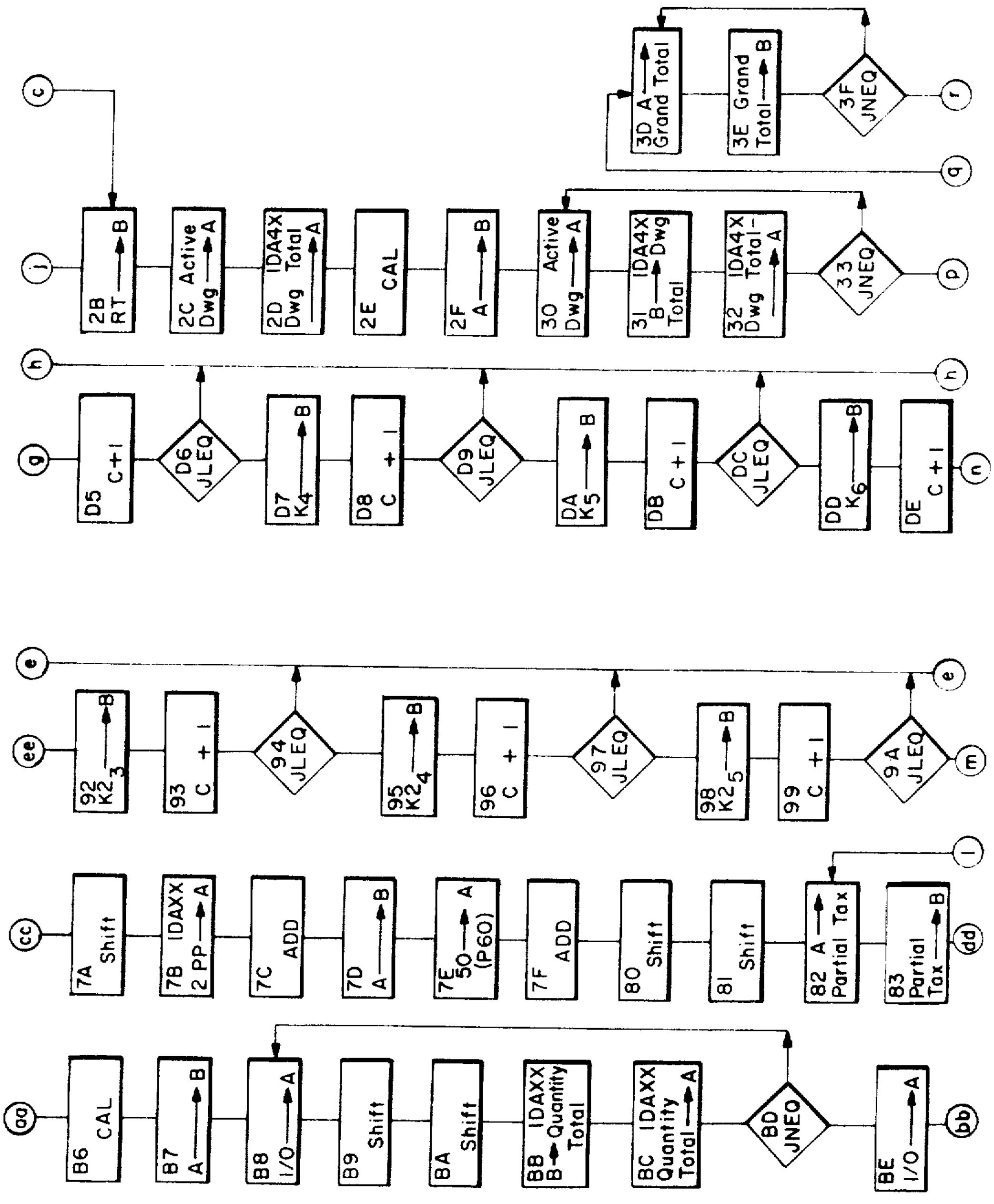
Figure 11D:
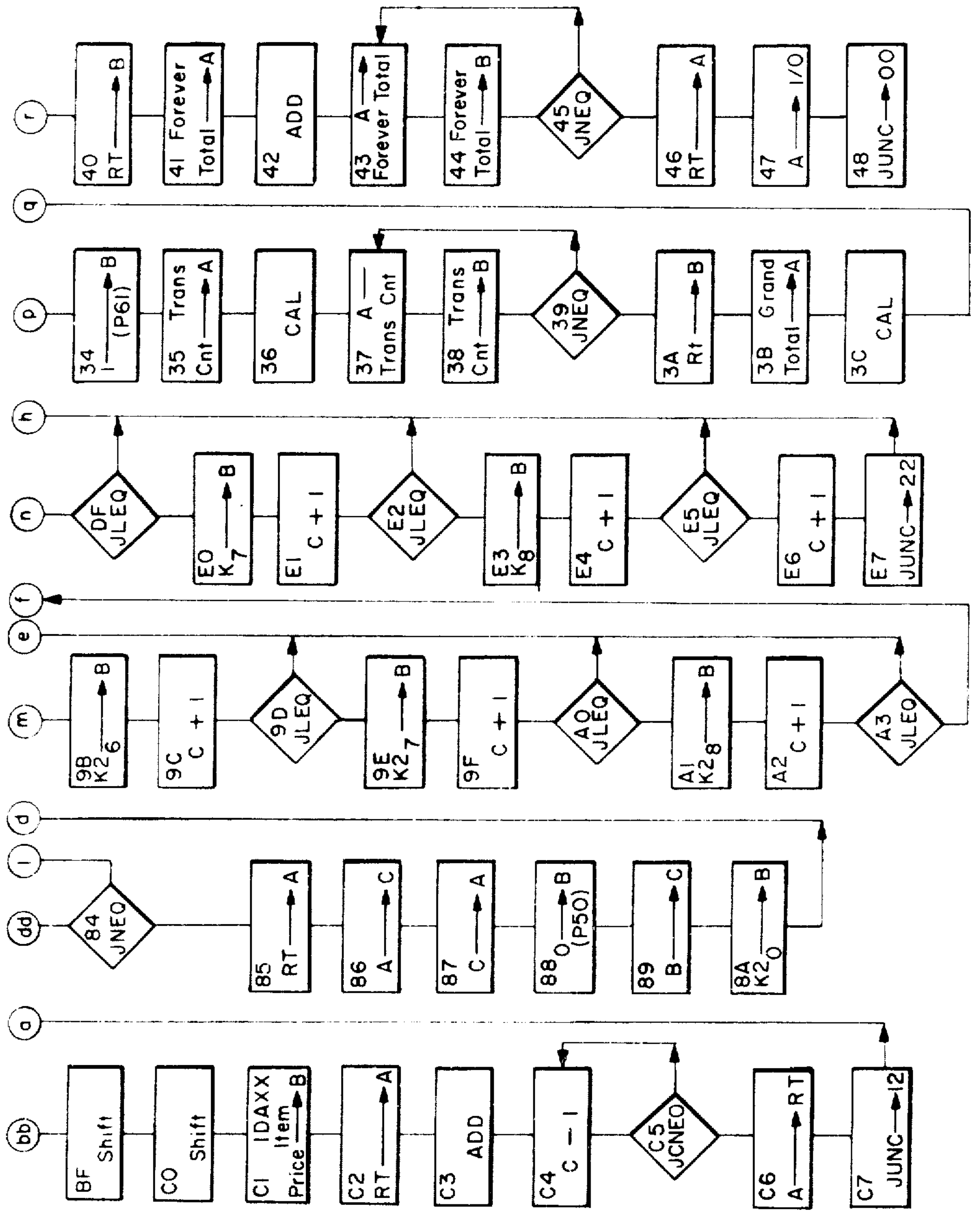
Figure 12:
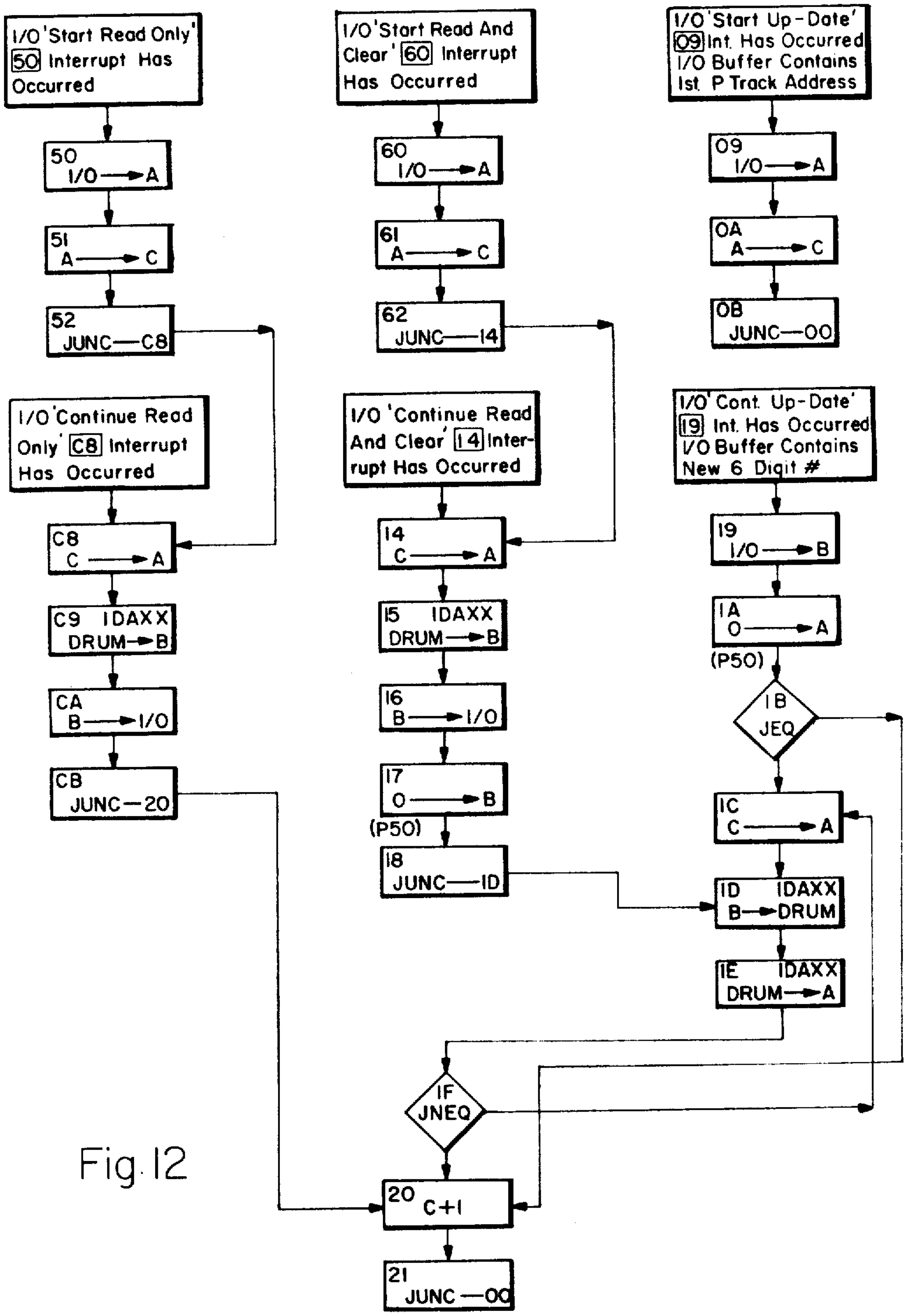

FIGS. 10 to 12 show the detailed program flow for the computer in terms of the various interrupt programs. Rectangular and diamond shaped boxes have the same meaning as the usual computer programming formats. The combination of letters or numbers in the top corner of each box indicates the address location in hexidecimal notation of the address for a particular operation or command location in the read-only memory. This notation will also serve to indicate a particular box in the description to follow.

In an [OC] interrupt, (FIGS. 11A–D), a clerk number is transferred from the input-output to the A register and then transferred to the active drawer in Q track address 59 in the memory drum. This clerk number will still be retained however in the A register. The clerk number in the active drawer is then transferred to the B register. The A and B register are then compared as an error check and the program continues. This is shown in boxes OC, OD, OE and OF. In boxes 10, 11, 12 and 13 the registers are cleared by placing a zero in the A register, transferring the zeros to the RT register and also to the B register; the program then jumps unconditionally to location 00 and waits for the next interrupt command.

The [BO] interrupt represents the item quantity transaction. Here the quantity of a particular item is shifted from the input-output register after having been sensed by the reader form and then transferred to the A register. The quantity data are then shifted to the C register. This is shown in B0 and B1. The A register is shifted to the right twice and the total item quantity from the drum is transferred to the A register. This is shown in B2, B3, and B4. The quantity purchased which had been transferred to the C register is then transferred to the B register in B5. The contents of the A and B registers are then added in the adder as shown in B6 and the addition result is transferred back to the A register and then to the B register in B7. Since this operation has erased the original input-output transaction from the A register, it must be reinserted; this is done in B8. Two shifts in B9 and BA bring the item purchase to the extreme right hand side of the register. In BB the new item quantity total is transferred to the memory drum; in BC this item quantity is then read into the A register. An error check loop in BD compares the A and B register contents to insure they are the same. The program then cotinues. In BE, BF and CO the quantity in the input-output is again read into the A register which is then shifted twice to bring the number to the extreme right hand side. In C1 the item price is read from the drum into the B register and in C2 the quanitty in the running total is transferred into the A register. In C3 repeated addition in the adder of the contents of the A and B register will determine the quantity multiplied by the price; the number of additions are determined by decrementing the C register and performing an iterative loop in C3, C4 and C5, until this total addition has been completed. The contents of the adder are then automatically transferred to the A register. In C6, the price in the A register is then transferred to the running total; in C7 the program then jumps unconditionally back to 12 where the quantity times the price transaction is transferred from the A to the B register after which in 13 the program jumps unconditionally to 00 and awaits the next interrupt instruction.

The next major interrupt operation is the tax interrupt [68]. This involves bringing the taxable total to date from Q track address 54 into the A register. The contents of the B register containing the quantity times price transaction (from 12) is added to this taxable total in the adder as shown in 69. The total in the adder is then automatically transferred to the A register and read into the drum in 6A. An error check as shown in BB, BC and BD is routined in 6A, 6B and 6C and the program continues. In 6D, the running total from 6C is then placed in the A register; the B and C registers are cleared in 6E and 6F by transferring a zero into the B register and then into the C register. If state laws require a tax breakpoint calculation, this is commenced in 70. The tax breakpoint is entered into the B register from memory address 40 on the P track; if the running total is less than the tax breakpoint, the program moves to location CC where the cents tax is calculated. This will be discussed subsequently. If the tax breakpoint is less than the running total, the main program is continued from 72 and 73. The tax calculation involves shifting the A register twice to the right, calculating the first partial product, and placing it in the A register in 74, removing the least significant digit in the A register by a right shift in 75 and then transferring the contents of the A register to the B register in 76. Since the A register will have been cleared by this operation, the running total is reinserted back into the A register in 77 and a 3 roundoff shift in 78, 79 and 7A will obtain the second partial product in the A register. The first partial product in B and the second partial product in A are then added in 7C and transferred from the A register to the B register in 7D. A roundoff to the next highest number is made in 7E and 7F by taking the digits 000050 from P track address 60, placing it in the A register and then adding the A and B registers. The decimal is corrected by two shifts in 80 and 81 to obtain the tax on the dollar value of the purchase. In 82 and 83 the partial tax is transferred from the A register to the partial tax drawer in the memory drum at a track address 58 and an error check routine is made in 82, 83 and 84. The tax on the cents value of the transaction is commenced in 85, 86 and 87. This involves a left and right digit roundoff by transferring the running total into the A register to obtain the left roundoff then into the 2 digit C register for the right roundoff and back again into the A register. The B and C registers are then cleared in 88 and 89. The cents tax is then calculated by incrementing the B register one penny at a time and comparing this with the rounded off figure in the A register. When the amounts are equal, the program then jumps to A5. This is shown in 8A through 8F, 90 through 99, 9A through 9F, and A0 through A4. The cents tax calculation is transferred into the B register in A5 and the partial tax placed again into the A register in A6. The A and B registers are added in A7 and the contents are placed into the B register in A8. The program then unconditionally jumps to 23 for housekeeping operations.

If the running total was less than the tax breakpoint, as previously discussed in 71, the program moves to CC (FIG. 11B) and a cents tax addition routine is made. This is carried out in CC, CD, CE and CF, D0 through D9, DA through DF, and E0 through E7. The net result of the cents tax calculation is that the cents amount from the B register and the dollar amount in the RT register are transferred to the B register in 22. The running total (from C6) is reinserted to A in 23, and the tax added to the running total in 24. In 26, the total tax from the memory drum track is placed in register A; in 27 this is added to the tax still in B. In 28, the new total tax is then placed in the memory drum and an error routine is made in 28, 29 and 2A. The program is then continued by updating the value of the total transaction attributed to a particular clerk. This involves placing the running total from C6 into the B register in 2B, placing the clerk's number for the transaction in question from the active drawer into the A register in 2C and using this number as the indirect address to obtain the total transaction attributed to a clerk from its drum location and reading it into the A register. The clerk's previous transactions and the immediate transaction are then added in 2E and then transferred to the B register in 2F. In 30 to 33 the clerk number and transactions associated with the clerk are placed in the memory drum and an error check routine is entered into. The program then continues and the total transaction counts are determined in 33 to 39. Briefly this consists of placing the number one in the B register, transferring the transaction count into the A register and adding. This has the effect of incrementing the transaction count by one. A transaction error routine is then made; the grand total and forever total are similarly calculated. In 46, the running total is then placed into the A register and transferred to the output in 47. Finally the program jumps unconditionally to 00 which is the starting point for a new interrupt routine.

A no tax [03] interrupt transaction (FIG. 11A) is shown in 03 to 08 and is self-explanatory.

The read and update mode (FIG. 12) is commenced by a [50] interrupt. In 50 to 52 the starting address is placed in the C register and then retransferred in C8 to the A register to obtain a 2 digit address. Using this 2 digit address as an indirect address in the A register, data are sent from the drum into the B register, transferred to the input register and the process is repeated 5 times to complete the readout form. This is shown in C8, C9, CA, CB and 20.

Interrupt [60] (FIG. 12) is the start, read and clear mode. The steps here are similar to the [50] interrupt except that after the readout has occured, the B register is cleared in 17; using the indirect address specified in the A register, the corresponding location in the drum is cleared as shown in 1D. The drum clearing operation using the B register clear is checked in the 1C, 1D, 1E and 1F error routine.

The [09] interrupt for the start up date simply involves placing the first P track address in the C register.

The continue update routine, which is a [19] interrupt, involves placing the contents of the input-output into the B register, clearing the A register, addressing the A register with the contents of the C register obtained in 0A, and using this indirect address to load the drum. This is shown in 19, 1A, 1B, 1C, 1D, 1E, and 1F.

Thus the computer of the present invention is greatly simplified in its organization since the various interrupt codes are triggered not by an internally stored program but externally using clock lines or other suitable indicating means on the appropriate form.

What is claimed is:

1. A digital computer for recording and calculating transaction data on an input-output form bearing clock lines and corresponding rows of data blocks containing data marks comprising:

means to feed the form containing the data into a form reader;

means to scan a row of blocks adjacent clock lines on the form for quantity of an item and price data until a data mark in a row of blocks corresponding to a clock line is sensed;

means to stop the form for a time interval;

memory means for storing sensed data;

means to continue the form feeding and the scan, stop data storage for each succeeding row of blocks corresponding to a clock line until all the data have been sensed;

means to calculate quantity and price transactions and for storing the results of the transaction in the memory; and means to print the data printout and the total transaction calculation on the form.

2. The apparatus of claim 1, including means for printing quantity, price and quantity $x$ price data onto the form.

* * * * *

UNITED STATES PATENT OFFICE
CERTIFICATE OF CORRECTION

Patent No. 3,751,637 Dated August 7, 1973

Inventor(s) Neil J. Dillon and Boris R. Sincich

It is certified that error appears in the above-identified patent and that said Letters Patent are hereby corrected as shown below:

In col. 1, line 57, after "register" change "3" to read --13--
" line 59, after "(I/O)" delete "13,14"

" line 61, after "tween" delete "and" and add --the--
In col. 2, line [illegible], after "circuit" change "in" to read --17--
" line 21, after "logic", correct "circuig" to read --circuit--
" line 27 & 28, after "25" correct "advace" to read --advance--
" line 58, after "mence" correct "Oeprations" to read --operations--
In col. 5, line 28, after "9" correct "ar" to read --are--
" line 50, after "form reader" delete "to"
In col. 6, line 15, after "and" correct "th" to --the--
In col. 7, line 44, after "stopped" delete "so" and insert --. If--
" line 59, after "FIGS." delete "6,"
In col. 8, line 56, after "then" correct "cotinues" to read --continues--
In col. 9, line 47, after "drum at" change "a" to read --Q--

Signed and sealed this 15th day of January 1974.

(SEAL)
Attest:

EDWARD M. FLETCHER, JR.
Attesting Officer

RENE D. TEGTMEYER
Acting Commissioner of Patents

UNITED STATES PATENT OFFICE
CERTIFICATE OF CORRECTION

Patent No. 3,751,637 Dated Aug. 7, 1973

Inventor(s) Neil J. Dillon & Boris R. Sincich

It is certified that error appears in the above-identified patent and that said Letters Patent are hereby corrected as shown below:

Under Related U.S. Application Data:

Date shown should read --Jan. 11, 1971-- instead of Jan. 17, 1971.

Signed and sealed this 27th day of August 1974.

(SEAL)
Attest:

McCOY M. GIBSON, JR.
Attesting Officer

C. MARSHALL DANN
Commissioner of Patents